Jan. 28, 1969  C. V. BROWN  3,423,888
FIBRILLATION
Filed March 7, 1966

INVENTOR
C. V. BROWN
BY Young + Quigg
ATTORNEYS

United States Patent Office 3,423,888
Patented Jan. 28, 1969

3,423,888
FIBRILLATION
Claude V. Brown, Bartlesville, Okla., assignor to Phillips Petroleum Company, a corporation of Delaware
Filed Mar. 7, 1966, Ser. No. 532,389
U.S. Cl. 51—319
Int. Cl. B24b 1/00; B24c 1/00, 3/00
6 Claims

ABSTRACT OF THE DISCLOSURE

Plastic film is oriented sufficiently to be fibrillatable and then fibrillated without special support of the film by impinging a plurality of particles thereagainst with sufficient force to cause fibrillation thereof.

---

This invention relates to a method for fibrillating film.

Heretofore, oriented plastic film has been fibrillated by impinging various materials thereon; however, in these processes the film is specially supported in the area in which fibrillation is taking place by rubber rollers, endless rubber back-up belts, and the like. This special supporting of the film in the area where it is being fibrillated adds expense to the operation in that it must be kept under surveillance and maintained.

It has now been found that oriented plastic film can be fibrillated without special supporting of the film at the area where it is being fibrillated by impinging a plurality of hard, sharp particles, preferably fluid carried, having a maximum dimension no larger than ⅛ of an inch against the film to be fibrillated with sufficient force to cause fibrillation thereof. It was surprisingly found that by employing this technique not only does the film not have to be specially supported in a manner to prevent yielding thereof to the force of the impinging particles but that such supporting is undesirable if optimum fibrillation is to be achieved.

Accordingly, it is an object of this invention to provide a new and improved method for fibrillation.

Other aspects, objects, and the several advantages of this invention will be apparent to those skilled in the art from the description, drawings, and appended claims.

Figure 1:
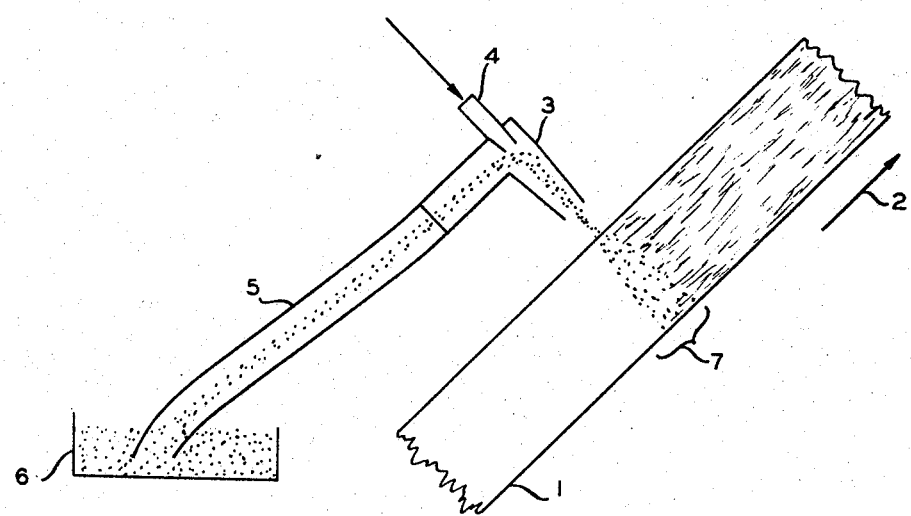

In the drawings, FIGURE 1 shows one embodiment for carrying out this invention.

Figure 2:
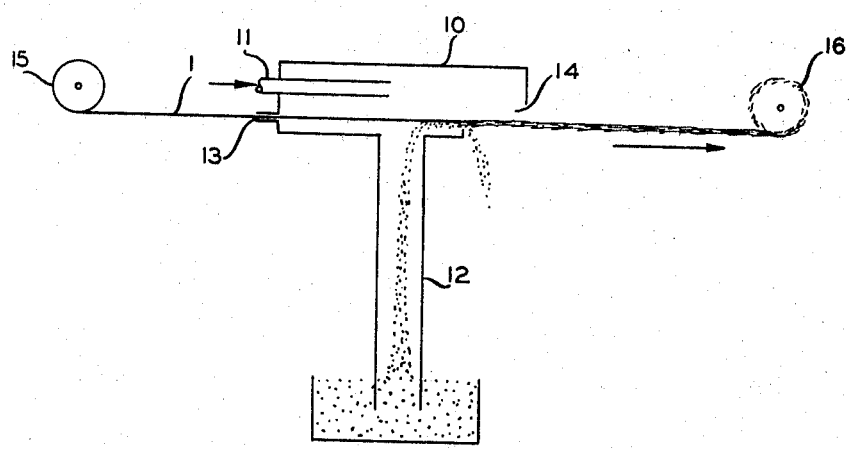

FIGURE 2 shows another embodiment for carrying out this invention.

In FIGURE 1 there is shown an oriented plastic film 1 moving in the direction of arrow 2 past a dispersing spray gun 3. Gun 3 has a conduit 4 through which a carrier fluid under pressure enters the gun. The passage of fluid through the gun causes a partial vacuum to be pulled in conduit 5 which is connected to a source of particulate material 6 and thereby pulls particulate material through conduit 5 into gun 3 to mix with the fluid therein. The mixture of particulate material and fluid is then forced from gun 3 against film 1 and causes fibrillation of that film. Film 1 is supported only by the feed roll and take-up roll at either end thereof (not shown), and is not specially supported in area 7 where fibrillation is taking place. In other words, that side of film 1 which is opposite to the side on which the fluid is impinging is free to yield in the direction of movement and under the force of the fluid.

FIGURE 2 shows a dispersing gun 10 with a fluid-admitting conduit 11 and a particle-admitting conduit 12. Gun 10 has a modification that the film to be fibrillated enters the interior of the gun from feed roll 15 through conduit 13 fitted with a conventional vacuum seal (not shown) and the particulate material is impinged on the film 1 on the interior of the gun so that a fibrillated product issues from the nozzle end 14 of that gun and is wound up on take-up roll 16.

Generally, any orientable plastic film can be employed in this process. The film can be uniaxially, biaxially, or other multi-axially oriented condition. The film can be oriented in any conventional manner well known to those skilled in the art including super-cooling the film and then orienting same by stretching and the like or heating the film to a temperature below that at which the film is in the molten state and then stretching same. By orientation, what is generally meant to be covered is deforming, e.g., stretching the film below that temperature at which the film is substantially in the molten state, to thereby increase the strength of the film at least in the direction in which it is deformed.

Generally, films of 1-olefins having from 2 to 8 carbon atoms per molecule which have been oriented by stretching before or during fibrillation in at least one direction so that the film after stretching is at least 3 times longer in the direction of stretching than it was before stretching, i.e., 3 to 1, can be used. When film of polyethylene which has a density of at least about 0.94 gram per cubic centimeter is employed the ratio of length in the stretched direction to original length should be at least 4 to 1 and when polypropylene is employed this ratio should be at least 6 to 1. Polymers of 1-olefins can be made in any conventional manner. A particularly suitable method is that disclosed in U.S. Patent 2,853,741. The film can be made from the polymers in any conventional manner such as by extrusion, casting, flattening blown tubing, and the like.

Other conventional plastic films that can be employed in this invention include blends and copolymers of 1-olefins as above-described with each other and with other polymers such as polyamides, polyesters, polyvinyl alcohol, acrylic polymers, polyvinyl chloride, polyvinyl acetate, polyvinylidene chloride, and the like. Of course, homopolymers of the 1-olefins and other materials described can also be employed as well as copolymers. A stretch or orientation ratio of at least 3 to 1 can also be employed with these plastic films.

The film can be of any length and width and substantially any thickness, the minimum thickness of the film being that which will produce a substantially self-sustaining film and the maximum thickness being dictated by the fibrillation capability of the apparatus employed. Preferably, the thickness of the film will vary from that which is sufficient to form a substantially self-sustaining film, e.g., ½ mil, to about 6 mils. Thicker films can be treated by using heavier duty apparatus, higher pressures, and larger particles; however, risk is run by such an operation of shredding rather than fibrillating the film. Repeated passes past the same dispersing gun can be employed to more thoroughly fibrillate a film or to effectively fibrillate thicker and/or tougher films with lighter apparatus.

The method of this invention can also be adjusted so that fibrillation of the film does not take place but, in effect, impingement of the particle carrying fluid on the film acts as a pretreatment for subsequent conventional splitting such as by rolling, stretching the film between two elastomeric materials, and the like.

The particulate material employed can be any relatively hard material which is capable of being comminuted into particles having at least one sharp edge or point. The sharp particles employed in this invention effect a piercing, abrading, or cutting function on the film to fibrillate same. Examples of such materials include common sand, comminuted rock, comminuted clinkers, metal chips, polymer particles, and the like. The size of the particles can vary widely, there presently being no apparent minimum size other than that which will effect fibrillation of the film without the use of inordinantly high fluid pressure. Generally, the maximum dimension of the particles will not exceed ⅛ of an inch since larger particles effect tearing or shredding of the unsupported film rather than fibrillation.

The carrier fluid can be liquid, e.g., water, hydrocarbons, and the like, or gaseous, e.g., air, nitrogen, helium, and the like. Gaseous carriers are presently preferred; however, liquid carriers are operable. The pressure with which the carrier is forced against the film can vary widely depending upon the particles dispersed therein, the type of carrier, and the type of film to be fibrillated as well as the degree of orientation of that film, etc. Generally, the pressure will be at least 50 p.s.i.g., the maximum pressure being dictated by practicality rather than functionality although too much pressure may cause tearing of the film. The pressure employed will desirably be that which is sufficient to effect fibrillation of the film treated and can be in the range of from about 75 to about 500 p.s.i.g. although higher pressures can be employed. The pressure of the fluid should also be sufficient to pull particles from their source into the gun and to disperse those particles in the fluid before impingement on the film. Dispersing or turbulence generating devices can be employed in or on the gun especially at its nozzle end. Particles can be gravity fed into the gun and the fluid pressure consequently reduced to that pressure necessary to cause fibrillation. The film should not be passed too closely to the end of the dispersing gun from which the carrier fluid is issuing because shredding rather than fibrillation can take place. Generally, the film will be passed from 1 to 6 or more inches away from the dispersing gun outlet nozzle, the maximum spacing being dictated by whether fibrillation is effected or not. The film can be passed by the dispersing gun outlet nozzle at any rate which will effect fibrillation. This rate will vary widely depending upon various parameters.

The dispersing gun can be adapted to treat the full width of any smaller width section of the film or can be moved either laterally or longitudinally relative to the film to effect fibrillation of the full width of the film or any portion thereof. Thus, the film can be decorated by suitable movement of a dispersing gun over the surface of the film, thereby fibrillating only portions of that film.

The angle of impingement of the particles on the film can vary from a very acute angle relative to the flat surface of the film, e.g. on the order of 10°, to a right angle with respect to the surface of the film, the right angle being presently preferred.

It should be noted that the propelling force of the particles can be supplied by means other than a fluid under pressure. For example, the centrifugal force of a shot peening wheel or a grit blasting wheel can be employed to force the particles against the film and cause fibrillation thereof.

EXAMPLE I

Blown tubing having a 1 mil thickness and composed of a homopolymer of ethylene having a density of 0.96 gram per cubic centimeter and a melt index of 0.2 was flattened to form a 2 mil thick film 12 inches wide.

The film was then stretched at 220° F. until the stretched length was 6 times that of the original prestretched length, i.e., stretched 500 percent.

A dispersion of river bottom sand which was screened so that the particles had a maximum dimension no greater than ⅟₁₆ of an inch was dispersed in air under a pressure of 100 p.s.i.g. in an apparatus similar to that shown in FIGURE 1. The film was passed by the outlet nozzle of the gun at a spacing of 1 to 2 inches from that nozzle and at a rate of about 30 feet per minute so that the air-sand dispersion impinged on that film at an angle of about 90° with respect to the surface of the film.

Fibrillation readily occured in the film and the fibrillated product was a uniformly split, non-woven fabric.

The process was repeated varying the angle of inclination of the gun to the surface of the film and at all angles a fibrillated product was obtained.

EXAMPLE II

Blown tubing having a 1 mil wall thickness and composed of a homopolymer of propylene having a melt flow of from 2.5 to 4 (ASTM D–1238–62T, Condition L, grams/10 minutes) and a flexural modulus equal to or greater than 200,000 (ASTM D–790–63, 73° F., p.s.i.) was flattened to form 2-mil-thick film 12 inches wide.

The film was stretched at a temperature of 350° F. until the length in the stretched direction was 8 times that of the unstretched length, i.e., 700 percent.

The film was then passed by the same apparatus as employed in Example I, which apparatus was also employing the same sand and air as in Example I. The film was passed at substantially the same distance from the outlet nozzle of the dispersing gun and at the same speed as Example I. The dispersing gun was employed at an angle of 90° to the surface of the film as well as various actute angles and here also in all case fibrillation occurred.

Reasonable variations and modifications are possible within the scope of this disclosure without departing from the spirit and scope thereof.

I claim:
1. A method for fibrillating an orientable plastic film comprising orienting said film sufficiently to make same fibrillatable, supporting said oriented film so that the film in the area where it is to be fibrillated is unsupported by a backup, fibrillating said film by impinging hard particles having at least one sharp protrusion and a maximum dimension no larger than ⅛ inch against said film in the area where said film is unsupported, and controlling the impact force of said impinging particles so that it is sufficient to cause fibrillation but not sufficient to cause the particles to pass through the film.

2. The method according to claim 1 wherein said particles are suspended in a fluid and the particle-supporting fluid is impinged on said film.

3. The method according to claim 1 wherein said film is composed of at least one of oriented homopolymers and/or copolymers and/or blends thereof, of 1-olefins having from 2 to 8 carbon atoms per molecule, and polyamides, and the film is oriented so that the oriented length is at least 3 times the unoriented length.

4. The method according to claim 2 wherein the film is polyethylene, the carrier fluid is air under an elevated pressure of at least 50 p.s.i.g., and the particles are sand particles having a maximum dimension no greater than ⅟₁₆ inch.

5. The method according to claim 2 wherein the film is polypropylene, the carrier fluid is air under an elevated pressure of at least 50 p.s.i.g., and the particles are sand particles having a maximum dimension no greater than ⅟₁₆ inch.

6. The method according to claim 2 wherein said fluid is introduced into a confined zone at a velocity sufficient to pull said particles into said zone, and the film to be fibrillated is passed through said zone so that impingement of said particles on said film and therefore fibrillation thereof takes place substantially entirely within said zone.

References Cited

UNITED STATES PATENTS

| | | | |
|---|---|---|---|
| 1,125,232 | 1/1915 | Weyl | 51—319 |
| 1,202,368 | 10/1016 | Cutter. | |
| 2,448,316 | 8/1948 | Lesavoy | 51—319 X |
| 2,774,679 | 12/1956 | Remer | 51—321 X |
| 3,242,035 | 3/1966 | White | 161—168 |
| 3,273,329 | 9/1966 | Scragg | 57—140 |

LESTER M. SWINGLE, *Primary Examiner.*

U.S. Cl. X.R.

51—14

Disclaimer and Dedication 3,423,888.—*Claude V. Brown*, Bartlesville, Okla. FIBRILLATION. Patent dated Jan. 28, 1969. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]